United States Patent [19]

Mudra

[11] Patent Number: 5,301,024
[45] Date of Patent: Apr. 5, 1994

[54] VIDEO SIGNAL PEAK COMPRESSOR

[75] Inventor: Robert E. Mudra, Glenview, Ill.

[73] Assignee: Zenith Electronics Corp., Glenview, Ill.

[21] Appl. No.: 998,275

[22] Filed: Dec. 30, 1992

[51] Int. Cl.$^5$ .......................... H04N 5/14; H04N 5/20
[52] U.S. Cl. ...................................................... 348/690
[58] Field of Search ............... 358/168, 169, 170, 164, 358/174, 166; 307/362, 363; 328/169, 170, 172, 175; H04N 5/237, 5/57, 5/14, 5/202, 5/52, 5/16, 5/20

[56] References Cited

U.S. PATENT DOCUMENTS

| | | | |
|---|---|---|---|
| 4,214,272 | 7/1980 | Hapgood | 358/170 |
| 4,937,670 | 6/1990 | Whitledge | 358/169 |
| 5,021,885 | 6/1991 | Kim | 358/168 |
| 5,247,360 | 9/1993 | Kawada et al. | 358/168 |

FOREIGN PATENT DOCUMENTS

| | | | |
|---|---|---|---|
| 0097500 | 1/1984 | European Pat. Off. | 358/168 |
| 22120 | 2/1979 | Japan | 358/174 |
| 0068774 | 5/1980 | Japan | 358/170 |
| 292970 | 11/1989 | Japan | H04N 5/202 |
| 260769 | 10/1990 | Japan | H04N 5/140 |
| 3284063 | 12/1991 | Japan | H04N 5/14 |

*Primary Examiner*—James J. Groody
*Assistant Examiner*—Chris Grant

[57] ABSTRACT

A video signal peak compressor circuit includes an emitter follower stage together with a feedback amplifier having a conduction threshold determined by a pair of voltage divider resistors. The feedback amplifier responds to increased conduction of the emitter follower stage to apply a compensating current to the emitter follower base and thereby impose a nonlinear compressing characteristic upon the emitter follower transfer function. In the embodiment shown, the emitter follower stage includes a PNP transistor having an input signal applied to its base and an output signal taken at its emitter which is coupled to operating supply by a pair of resistors. The feedback amplifier includes a PNP transistor having its emitter coupled to the junction point of a voltage divider, its base coupled to the junction of the emitter follower resistors and its collector coupled to the base of the PNP emitter follower stage.

6 Claims, 2 Drawing Sheets

VIDEO SIGNAL PEAK COMPRESSOR

FIELD OF THE INVENTION

This invention relates generally to video or luminance signal processing systems within television receivers and particularly to systems for avoiding blooming during peak white signal conditions.

BACKGROUND OF THE INVENTION

Television receiver cathode ray tube displays have become commonplace in the television industry and indeed represent the normal television display system. While the designs of cathode ray tube displays are subject to great variation, all generally utilize a cathode ray tube having a plurality of electron beam guns supported in the ray tube neck which are directed toward a multicolor producing viewing screen on the interior of the cathode ray tube faceplate. Horizontal and vertical scan systems are operative upon the electron beams produced by the plural electron guns to deflect the electron beams horizontally and vertical in a raster scanning pattern to sequentially scan the phosphor screen. A shadow mask or similar masking device is interposed between the electron beam guns and the phosphor screen to cause each electron beam to fall exclusively upon a particular set of color phosphor screen areas. The electron beams are intensity modulated in synchronism with the scanning process to produce the displayed image. Color is achieved by varying the ratios or relative electron beam intensities while brightness variations are obtained by varying the plural electron beams as a group.

In many television receivers, the black and white or luminance information is separately processed and amplified prior to its combination with the color difference signals to produce color video signals which are used to intensity modulate the individual electron beams within the cathode ray tube display. Because black and dark grey image areas are produced by low currents and light greys and whites are produced by high beam currents, the display of very light grey or white image portions (so-called "peak white") necessitates correspondingly high cathode ray tube electron beam currents. As a result, high amplitude peak white image portions often cause the display system to produce cathode ray tube beam currents which exceed the focusing capability of the display. As a result, a phenomenon known as "blooming" occurs which is characterized by the production of bright areas which are undesirably enlarged and appear poorly defined or blurred.

To address this problem practitioners in the art have employed systems such as brightness limiters responsive to average beam current to control or limit average cathode ray tube beam current. Other approaches have included high voltage responsive gain controls as well as complex signal gain feedback systems operative within the luminance channel.

While the foregoing described prior art systems have to some extent been effective, they often tend to be overly complex and expensive and have, in some instances, been found to degrade display performance. There remains, therefore, a continuing need in the art for a simple, effective and low cost system for controlling and compensating peak white signal conditions within television receiver cathode ray tube displays.

Accordingly, it is a general object of the present invention to provide an improved video processing system for television receivers. It is a more particular object to provide an improved video signal processing system for television receivers which is inexpensive, simple, and effective in the control of peak white display system response.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
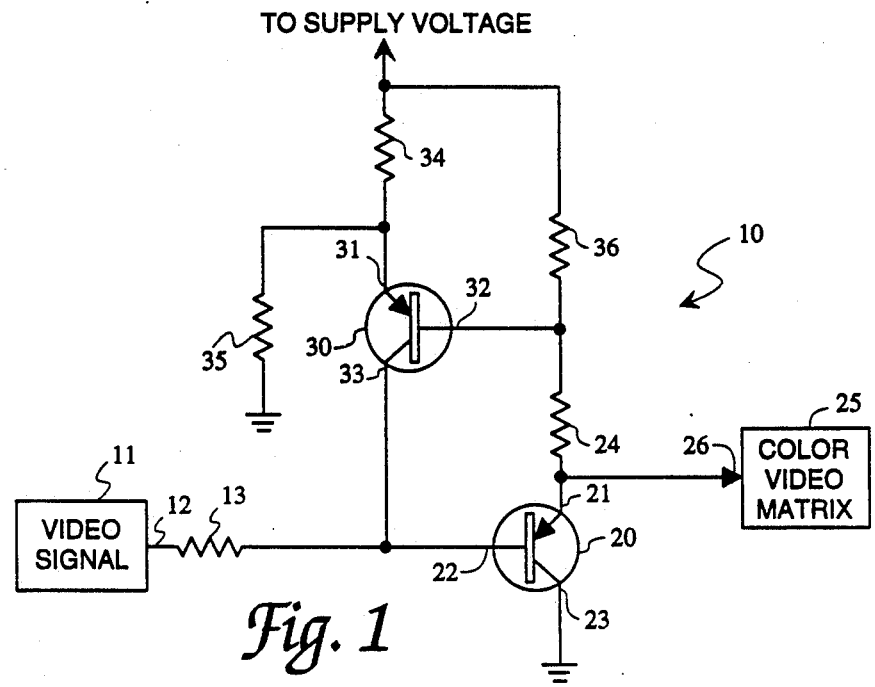
FIG. 1 sets forth a partial block diagram, partial schematic of a video signal peak compressor constructed in accordance with the present invention.

FIG. 1 sets forth a schematic diagram of a video signal peak compressor constructed in accordance with the present invention and generally referenced by numeral 10. A source of video signal 11 such as the video detector within a television receiver includes an output 12 producing a composite video and sync signal having the polarity shown in FIG. 3. A PNP transistor 20 includes an emitter 21, a base 22 coupled to output 12 by a resistor 13 and a collector 23 coupled to ground. Emitter 21 is coupled to a source of operating supply voltage (not shown) by a series combination of resistors 24 and 36. A PNP transistor 30 includes an emitter 31 coupled to operating supply by a resistor 34 and to ground by a resistor 35, a base 32 coupled to the junction of resistors 24 and 36, and a collector 33 coupled to base 22 of transistor 20. A color video matrix circuit 25 fabricated in accordance with conventional fabrication techniques includes a luminance signal input 26 coupled to emitter 21 of transistor 20.

In operation, an output compositive video and sync signal produced by video source 11 is coupled to base 22 of transistor 20 which under normal signal conditions functions as an emitter follower driver stage for color video matrix circuit 25. Thus, the output signal appearing at emitter 21 of transistor 20 under normal signal drive conditions is virtually the same as the signal applied to base 22. The polarity of applied signal at base 22 of transistor 20 is such that video signals corresponding to black or dark image areas produce relatively positive signal components while video signal elements corresponding to bright or white image elements produce low positive voltage signal components. Under most signal conditions, the conduction of transistor 20 produces a relatively small voltage drop across resistor 36 which in turn maintains base 32 of transistor 30 at a sufficiently positive voltage to hold transistor 30 off. In the event the video signal applied to base 22 corresponds to high brightness or peak white signal conditions, the conduction of transistor 20 is substantially increased which in turn produces a greater voltage drop across resistor 36 and lowers the voltage at base 32 of transistor 30. Once base 32 is dropped sufficiently below emitter 31 of transistor 30, transistor 30 begins conducting. The conduction of transistor 30 couples additional current to base 22 of transistor 20 which in turn raises the luminance signal at base 22 away from the peak white level (toward black). The signal at emitter 21 applied to color video matrix 25 rise correspondingly to the emitter follower configuration of transistor 20. As a result, the video signal applied to color video matrix 25 exhibits a decreased gain or transfer function which comprises the high brightness or peak white video signal components.

The threshold at which transistor 30 conducts is determined by the resistances of resistors 34 and 35 which form a voltage divider setting the bias voltage at emitter 31. It is important to note that while transistor 30 conducts an increased amount of current in response to the peak white video signal amplitude applied to transistor 20, transistor 20 remains operative and is not forced into a clipping or signal limiting condition. Thus, image detail is not lost during peak white conditions in the manner encountered by prior art limiting or clipping systems.

Figure 2:
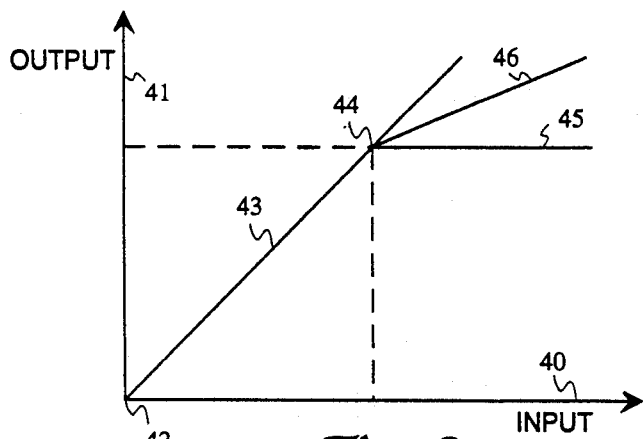
FIG. 2 sets forth an amplitude response characteristic diagram of the present invention video signal peak compressor.

FIG. 2 sets forth a transfer function for video signal peak compressor circuit 10. In the diagram of FIG. 2, the input signal amplitude is plotted along horizontal axis 40 while the resulting output signal amplitude is plotted along vertical axis 41. Axes 40 and 41 intersect at origin 42. A linear transfer function curve 43 is shown in which the output signal directly corresponds to the applied input signal. This transfer function is characteristic of an uncompensated conventional emitter follower amplifier stage. A threshold signal amplitude 44 is shown which corresponds to the video signal amplitude at which the above-described compression effect begins. Thus, curve 46 which represents the transfer function of the present invention video signal peak compressor is shown departing from linear curve 43 at threshold 44. As a result, the transfer function of the present invention peak compressor corresponds to a linear system for input signal conditions equal to or less than threshold 44. Above threshold 44, the output signal produced is compressed due to the reduced gain slope of transfer function 46 with the result that increases of input signal above-threshold 44 produce smaller incremental output signals. Transfer function 45 in FIG. 2 depicts the characteristic obtained in using a limiting circuit. As can be seen, such limiting circuits have the desired transfer characteristics below threshold 44. However, the limiting action precludes changes of output signal for all input signal conditions above threshold 44. This limiting manifests itself in the displayed image as a complete loss of all detail in the peak white areas and has been generally rejected by consumers.

Figure 3:
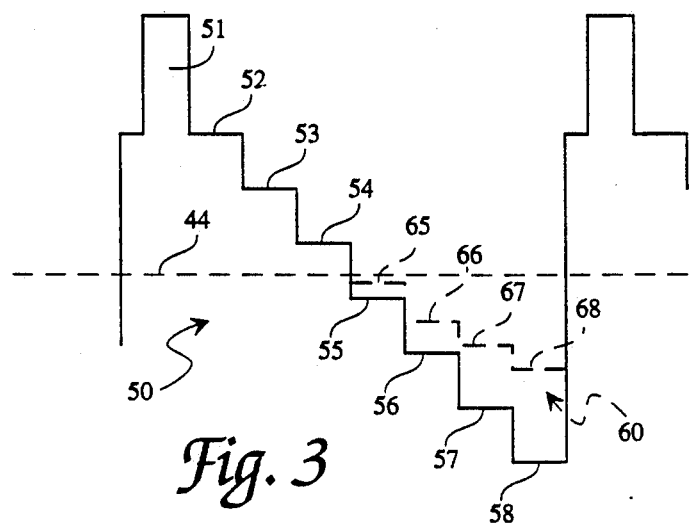
FIG. 3 sets forth a plurality of signal waveforms depicting the operative characteristics of the present invention video signal peak compressor.

FIG. 3 sets forth a typical video signal generally referenced by numeral 50 in response to a so-called "stair step" video pattern. Thus, waveform 50 includes a blanking signal 52 having a positive going sync pulse 51 and a succession of progressive lighter luminance portions 53, 54, 55, 56, 57 and 58. Level 53 corresponds to black image conditions while level 58 corresponds to peak white or maximum white signal conditions. Levels 53 through 57 represent progressively lighter grey scale signal conditions. For purposes of illustration, it is assumed that the threshold at which it is desired to compress the video signal (level 44) is positioned between levels 54 and 55. Thus, for input video signals corresponding to waveform 50, the output signal produced by the present invention video signal peak compressor corresponds to the dashed-line waveform generally referenced by numeral 60. Waveform 60 corresponds to waveform 50 for input signal conditions not exceeding threshold 44 but is compressed or nonlinear for signal conditions exceeding level 44. Thus, output waveform 60 exhibits levels 65, 66, 67 and 68 in response to inputs at levels 55 through 58 respectively. As a result, the high brightness or peak white signal components are compressed.

Figure 4:
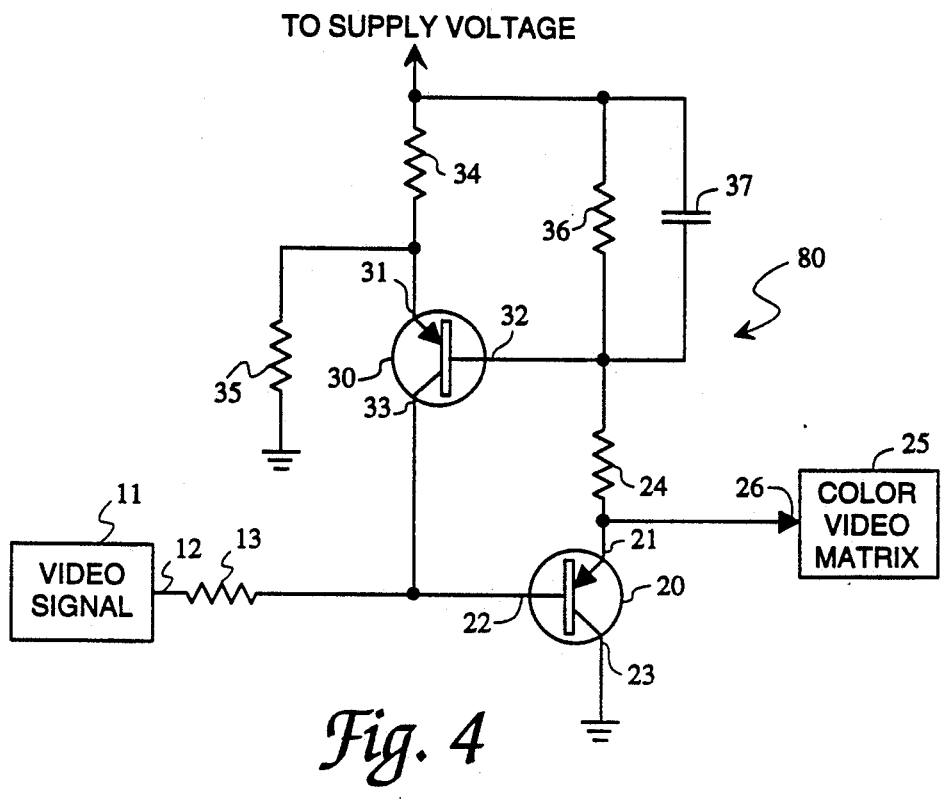
FIG. 4 sets forth a partial block diagram, partial schematic of an alternate embodiment of a video signal peak compressor constructed in accordance with the present invention.

FIG. 4 sets forth a partial block, partial schematic diagram of an alternate embodiment of the present invention video signal peak compressor generally referenced by numeral 80. Peak compressor 80 is identical to peak compressor 10 shown in FIG. 1 with the addition of capacitor 37 in parallel with resistor 36. Capacitor 37 provides a high frequency peak signal increase or "peaking" enhancement for the video signal. Thus, higher frequency video signal components are enhanced with respect to lower frequency peak signals and are not compressed or are compressed to a reduced degree. This in turn "peaks" the signal for improved overall picture quality.

Figure 5:
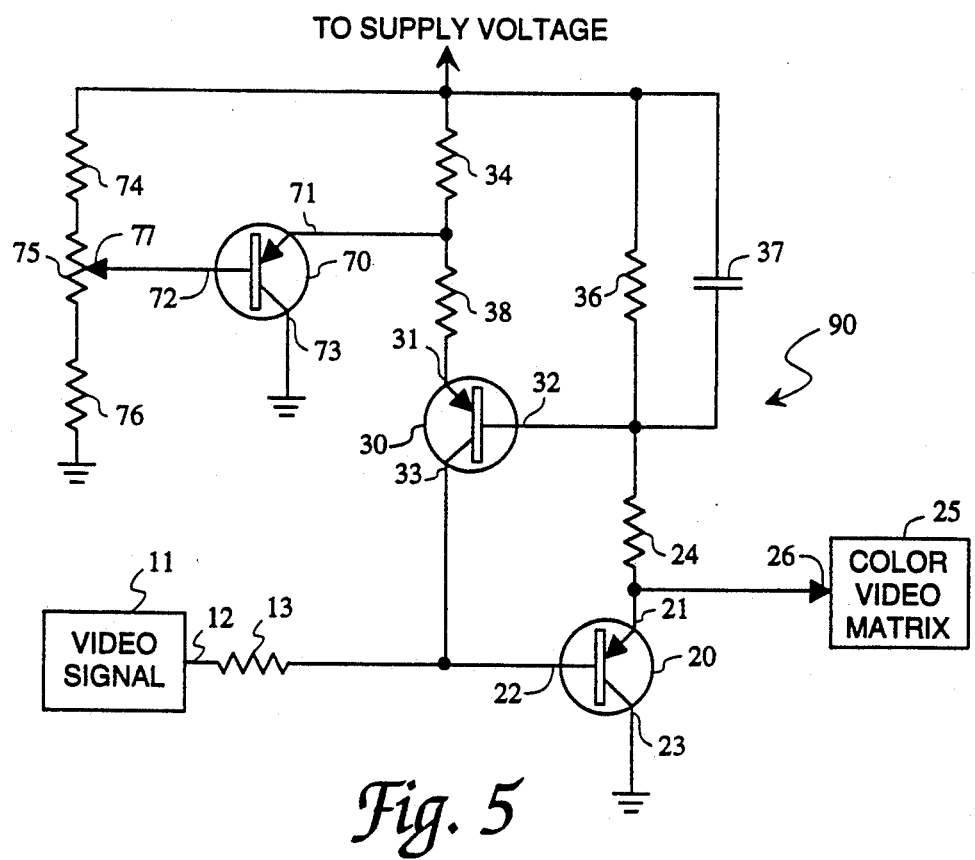
FIG. 5 sets forth a partial block diagram, partial schematic of a further alternate embodiment of a video signal peak compressor constructed in accordance with the present invention.

FIG. 5 sets forth a further alternate embodiment of the present invention video signal peak compressor generally referenced by numeral 90. Circuit 90 adds an adjustable compression threshold control to the alternate embodiment of FIG. 4. An additional resistor 38 is added in series with resistor 34. An adjustable voltage divider is formed by the series combination of a resistor 74, a potentiometer 75 and a resistor 76. Potentiometer 75 includes a movable contact 77. A PNP transistor 70 includes an emitter 71 coupled to the junction of resistors 34 and 38, a base 72 coupled to movable contact 77, and a collector 73 coupled to ground.

In operation, transistor 70 couples a variable bias voltage to emitter 31 of transistor 30 which is controlled by movable contact 77. This bias voltage in turn controls the signal level at base 32 which causes conduction of transistor 30. Thus, the compression thresh, shown as threshold 44 in FIG. 2, may be varied by adjustment of potentiometer 75.

What has been shown is a simple, effective and low cost video signal peak compressor for use in a television receiver. The system shown provides a compression threshold which is established by selection of a pair of voltage divider resistors and requires the addition of a single PNP transistor to an otherwise conventional luminance signal emitter follower stage. The system avoids the degrading effects of prior art limiters or clippers in that detail within compressed peak white image areas is preserved.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a television receiver having a source of video signal characterized by positive picture polarity, a video signal peak compressor comprising:
   a first amplifier having a first PNP transistor having a first input electrode coupled to said source of video signal, a first output electrode; and a first common electrode coupled to ground;
   a second amplifier having a second PNP transistor having a second input electrode coupled to said first output electrode, a second output electrode coupled to said first input electrode and a second common electrode; and
   a threshold voltage source including a resistive divider having a resistor junction coupled to said second common electrode.

2. For use in a television receiver having a source of video signal characterized by positive picture polarity, a video signal peak compressor comprising:
   a first amplifier having a first base electrode coupled to said source of video signal, a first emitter electrode; and a first collector electrode coupled to ground;
   a second amplifier having a second base electrode coupled to said first emitter electrode, a second collector electrode coupled to said first base electrode and a second emitter electrode; and
   a threshold voltage source coupled to said second common electrode.

3. A video signal peak compressor as set forth in claim 2 wherein said emitter of said first transistor is coupled to a source of operating supply voltage by a series coupled pair of resistors and wherein said base of said second transistor is coupled to the junction of said pair of resistors.

4. For use in a television receiver having a source of video signal, a video signal peak compressor comprising:
   a first PNP transistor having a first emitter, a first base coupled to said source of video signal, and a first collector coupled to ground;
   a second PNP transistor having a second emitter, a second base coupled to said first emitter and a second collector coupled to said first base; and
   a voltage divider having a junction point of two resistors coupled to said second emitter.

5. A video signal peak compressor as set forth in claim 4 further including a series coupled pair of resistors coupled to said first emitter defining a junction therebetween.

6. A video signal peak compressor as set forth in claim 5 wherein said second base is coupled to said junction.

* * * * *